(12) United States Patent
Al-Mulhim et al.

(10) Patent No.: US 10,344,221 B2
(45) Date of Patent: Jul. 9, 2019

(54) TANK DEWATERING SENSING AND VALVE CONTROL METHOD AND APPARATUS

(71) Applicant: Saudi Arabian Oil Company, Dhahran (SA)

(72) Inventors: Khalid Abdulaziz Al-Mulhim, Dhahran (SA); Salem Mohammed Al-Qahtani, Dhahran (SA)

(73) Assignee: Saudi Arabia Oil Company, Dhahran (SA)

( * ) Notice: Subject to any disclaimer, the term of this patent is extended or adjusted under 35 U.S.C. 154(b) by 0 days.

(21) Appl. No.: 15/957,094

(22) Filed: Apr. 19, 2018

(65) Prior Publication Data

US 2018/0298291 A1 Oct. 18, 2018

Related U.S. Application Data

(63) Continuation of application No. 13/628,305, filed on Sep. 27, 2012.

(60) Provisional application No. 61/541,713, filed on Sep. 30, 2011.

(51) Int. Cl.
*C10G 33/08* (2006.01)
*B01D 17/02* (2006.01)
*B01D 17/12* (2006.01)
*E21B 43/34* (2006.01)

(52) U.S. Cl.
CPC ......... *C10G 33/08* (2013.01); *B01D 17/0208* (2013.01); *B01D 17/12* (2013.01); *E21B 43/34* (2013.01)

(58) Field of Classification Search
None
See application file for complete search history.

*Primary Examiner* — Richard C Gurtowski
(74) *Attorney, Agent, or Firm* — Abelman, Frayne & Schwab

(57) ABSTRACT

A system for separating water from crude oil includes a bulk-storage tank for storing unrefined crude oil, a first pipe for delivering water separated from crude oil in the bulk-storage tank to a containment system, a second pipe for delivering crude oil to a shipping system, a first valve for controlling flow in the first pipe, a second valve for controlling flow in the second pipe, and a control system for controlling operation of the first and second valves. The control system has a control device for controlling the first and second valves, an acoustic sensor array mounted on the first pipe for sensing a sound pressure level during flow of water through the first pipe, means for comparing the sensed sound pressure level with a predetermined sound pressure threshold level characterizing flow of oil-water mixture through the pipe, and a control device for closing the first valve and opening the second valve when the measured sound pressure level reaches the sound pressure threshold level.

4 Claims, 11 Drawing Sheets

TANK DEWATERING SENSING AND VALVE CONTROL METHOD AND APPARATUS

RELATED APPLICATIONS

This application is a continuation application of U.S. patent application Ser. No. 13/628,305 filed Sep. 27, 2012 which claims the benefits of priority to U.S. Provisional Application No. 61/541,713 filed Sep. 30, 2011 and the disclosures of which are incorporated herein by reference thereto.

FIELD OF THE INVENTION

The present invention relates generally to dewatering a bulk-storage tank and, in particular, to a method and apparatus for detecting water-to-crude oil transition in a pipe.

BACKGROUND

Unrefined crude oil stored in a bulk-storage tank has a percentage of water entrained within the oil. Such crude oil is typically pumped into a bulk-storage tank prior to shipment. The capacity of bulk-storage tanks vary, but may be one-hundred (100) million barrels (i.e., 15.9 giga-liters). Over a period of twenty-four (24) to forty-eight (48) hours, the water and oil stored in a tank separate naturally, with the water collecting at the bottom of the tank beneath the oil. The separated water and the crude oil within the tank are very distinct except for a "black water" or "rag" interface layer. The black water interface layer is an emulsion of mixed oil and water.

Prior to transferring the crude oil to a bulk carrier for shipment, the crude oil stored in a bulk-storage tank requires dewatering (i.e., removing the water from the tank). Conventionally, the oil within a bulk-storage tank is dewatered by manually opening an outlet valve at the base of the bulk-storage tank and allowing any contained liquid to run through a pipe to a containment area. The liquid running through the pipe is initially water. An operator periodically checks the liquid, using a siphon point, to see if the liquid is water or oil. The siphon point may be in the form of a domestic tap attached to the pipe. When the operator determines that the liquid has transitioned from water to oil, which occurs after a random time, the operator closes the outlet valve on the bulk-storage tank to stop the flow of liquid. A conventional definition of "transition from water to crude oil" is when a ratio of water to crude oil in the liquid reaches 20:80 (i.e., 20% water: 80% crude oil). The remaining liquid in the tank, which is primarily crude oil, may then be transferred by a separate pipe to a transport system such as a shipping delivery system.

If the operator is unable to stop the flow of liquid from the tank at the point of the liquid transitioning to oil, then oil is sent to the containment area where the oil is trapped in a mixture of oil and waste-water. The oil may be recovered from the waste-water using conventional water processing methods. However, recovering the oil from the containment area is an expensive exercise.

The dewatering of a bulk-storage tank as described above often takes place in open air in extreme environmental conditions such as heat, wind, sand storms, and rain. The reliability and accuracy of such a dewatering method is subject to the diligence of the operators. In particular, the decision point for closure of the outlet valve at the transition of the liquid from water to oil is a subjective judgement and open to vary from one operator to another.

In order to remove the dependence on a human operator for detecting the transition of water to crude oil in a pipe, density sensors have been used to periodically determine density of the liquid within the pipe. One such density sensor is an insertion liquid density transducer (ILDT). An ILDT comprises a tuning fork which is immersed within a pipe in the liquid being measured. The tuning fork is excited into oscillation by a piezoelectric device (not shown) internally secured at the root of one tine. The frequency of the vibration of the tuning fork is detected by a second piezo-electric device secured in the root of the other tine of the tuning fork. The tuning fork is maintained at its natural resonant frequency, as modified by the surrounding liquid, by an amplifier circuit which may be located in an electronic housing. This frequency of vibration is a function of the overall mass of the tine element and the density of the liquid in contact with the tine element. As the density of the liquid changes, the overall vibrating mass changes together with the resonant frequency. By measuring the resonant frequency the density of the liquid can be determined. Another example of a density sensor may be in the form of a tube densitometer. A tube densitometer works in a similar manner to the ILDT discussed above.

The density measurements determined using such density sensors may be used to determine if the transition between water and oil has occurred. In this connection, Tables 3 and 4 of Appendix C show the density of water and crude oil. However, density sensors such as those discussed above are not suitable for use with any liquid of unpredictable or erosive nature which can damage the tines causing erratic results. Further, such density sensors require complicated fitting within a pipe in order to perform the sampling. Still further such density sensors are prone to fouling when sampling particularly viscous liquids such as crude oil.

Thus a need clearly exists for an improved method of detecting water to oil transition of liquid flowing in a pipe.

OBJECTS AND SUMMARY OF THE INVENTION

It is an object of the present invention to substantially overcome, or at least ameliorate, one or more disadvantages of prior art arrangements.

The present application discloses arrangements which seek to address the prior art problems by measuring one or more properties of liquid flowing within a pipe in order to detect water to oil transition.

One object of the present invention is to provide a method of detecting water to oil transition of liquid flowing in a pipe, said method comprising the steps of:

measuring sound pressure level produced by the liquid flowing at a predetermined point within the pipe;

comparing the measured sound pressure level to a predetermined threshold value stored in a computer readable memory; and detecting if the liquid flowing in the pipe at the predetermined point has transitioned from water to crude oil based on a result of the comparison.

Another object further to the above comprises the step of determining whether the liquid is flowing in a laminar or turbulent manner depending on the comparison.

Another object further to the above comprises the step of determining electrical conductivity of the liquid.

Another object further to the above comprises the step of measuring vibrations in the pipe caused by turbulence of fluid flow in the pipe.

Another object further the above comprises the steps of opening a valve to allow outflow of water from a storage tank, and later closing said valve in order to stop the liquid flowing out of the tank if the transition from water to oil has occurred at the predetermined point.

Another object is to provide an apparatus for detecting water to oil transition of liquid flowing in a pipe, said apparatus comprising:

measuring means for measuring the sound pressure level produced by the liquid flowing at a predetermined point within the pipe; and a processor for comparing the measured sound pressure level to a predetermined threshold value stored in a computer readable memory, and for detecting if the liquid flowing in the pipe at the predetermined point has transitioned from water to crude oil based on a result of the comparison.

Another object is to provide a computer readable storage medium, having a program recorded thereon, where the program is configured to make a computer execute a procedure to detect water to oil transition of liquid flowing in a pipe, said apparatus comprising:

code for measuring sound pressure level produced by the liquid flowing at a predetermined point within the pipe;

code for comparing the measured sound pressure level to a predetermined threshold value stored in a computer readable memory; and code for detecting if the liquid flowing in the pipe at the predetermined point has transitioned from water to crude oil based on a result of the comparison.

Another object is to provide a method of detecting water to oil transition of liquid flowing in a pipe, said method comprising the steps of:

measuring electrical conductivity of the liquid flowing at a predetermined point within the pipe;

comparing the measured conductivity to a predetermined threshold value stored in a computer readable memory; and detecting if the liquid flowing in the pipe at the predetermined point has transitioned from water to crude oil based on a result of the comparison.

Another object further to the above method comprises the step of determining whether the liquid is flowing in a laminar or turbulent manner depending on the comparison.

Another object further to the above method comprises the step of determining sound pressure level of the liquid.

Another object further to the above method comprises steps of opening a valve to allow outflow of water from a storage tank, and later closing said valve in order to stop the liquid flowing out of the tank if the transition from water to oil has occurred at the predetermined point.

Another object is to provide an apparatus for detecting water to oil transition of liquid flowing in a pipe, said apparatus comprising:

measuring means for measuring electrical conductivity of the liquid flowing at a predetermined point within the pipe; and a processor for comparing the measured conductivity to a predetermined threshold value stored in a computer readable memory, and for detecting if the liquid flowing in the pipe at the predetermined point has transitioned from water to crude oil based on a result of the comparison.

Another object is to provide a computer readable storage medium, having a program recorded thereon, where the program is configured to make a computer execute a procedure to detect water to oil transition of liquid flowing in a pipe, said apparatus comprising:

code for measuring conductivity of the liquid flowing at a predetermined point within the pipe;

code for comparing the measured conductivity to a predetermined threshold value stored in a computer readable memory; and code for detecting if the liquid flowing in the pipe at the predetermined point has transitioned from water to crude oil based on a result of the comparison.

Another object is to provide a method of detecting water to oil transition of liquid flowing in a pipe, said method comprising the steps of:

measuring vibration at a predetermined point of the pipe;

comparing the measured vibration to a predetermined threshold value stored in a computer readable memory; and detecting if the liquid flowing in the pipe at the predetermined point has transitioned from water to crude oil based on a result of the comparison.

Other aspects of the invention are disclosed in the following description.

BRIEF DESCRIPTION OF THE DRAWINGS

Some aspects of the prior art and one or more embodiments of the present invention will now be described with reference to the drawings and appendices, in which.

Where reference is made in any one or more of the accompanying drawings to steps and/or features, which have the same reference numerals, those steps and/or features have for the purposes of this description the same function(s) or operation(s), unless the contrary intention appears.

DETAILED DESCRIPTION OF THE PREFERRED EMBODIMENTS

It is to be noted that the discussions contained in the "Background" section and that above relating to prior art arrangements relate to discussions of documents or devices which form public knowledge through their respective publication and/or use. Such should not be interpreted as a representation by the present inventor(s) or patent applicant that such documents or devices in any way form part of the common general knowledge in the art. References will be made later herein to Appendix A, B and C where:

Appendix A is a table showing kinematic viscosity of water and crude oil,

Appendix B is a table showing conductivity information for water and crude oil, and Appendix C is a table showing density information for water and crude oil.

Figure 1:
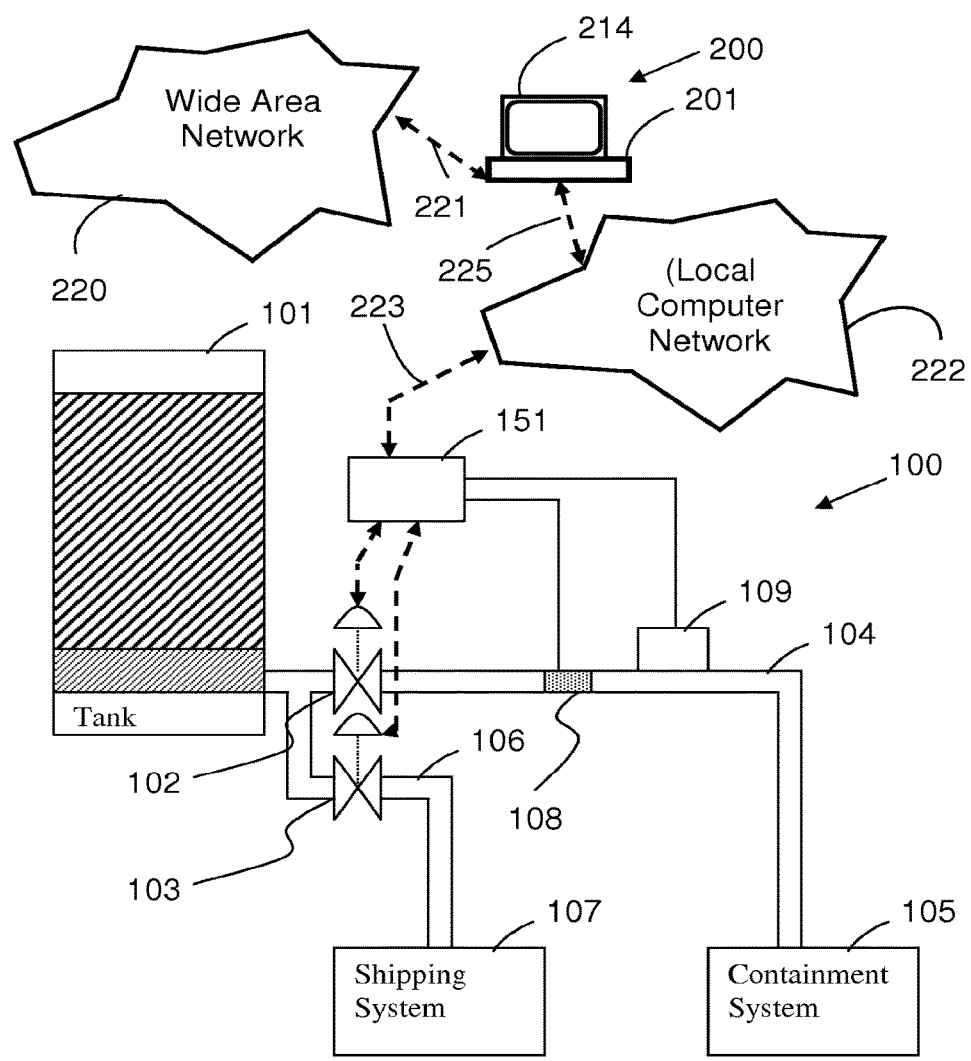
FIG. 1 shows a system for dewatering crude oil stored in a bulk-storage tank.

FIG. 1 shows a system 100 for dewatering a bulk-storage tank 101. The system 100 comprises two motorised valves 102 and 103. The valve 102 controls flow of liquid through a pipe 104 connecting the base of the tank 101 to a containment system 105. The valve 103 controls flow of liquid through another pipe 106 connecting the base of the tank 101 to a shipping (or transport) system 107.

A measuring means, in the form of an acoustic sensor array 109 is fixed at a predetermined point to the outside of the pipe 104. In one implementation, the acoustic sensor array 109 comprises two sensors (not shown) that output a voltage (e.g., 0-10 Volts) according to average sound pressure level (SPL) detected by the sensors of the acoustic sensor array 109.

Another measuring means, in the form of a conductivity sensor 108, is fixed at a further predetermined point to the outside of the pipe 104. In one implementation, the conductivity sensor 108 is an inductive, non-contact type sensor that outputs a current (0-20 mA) according to the average conductivity level detected.

Although the system 100 is described as comprising both the acoustic sensor array 109 and the conductivity sensor 108, in other implementations the system 100 may comprise one of either the acoustic sensor array 109 or the conductivity sensor 108.

Figure 2A:
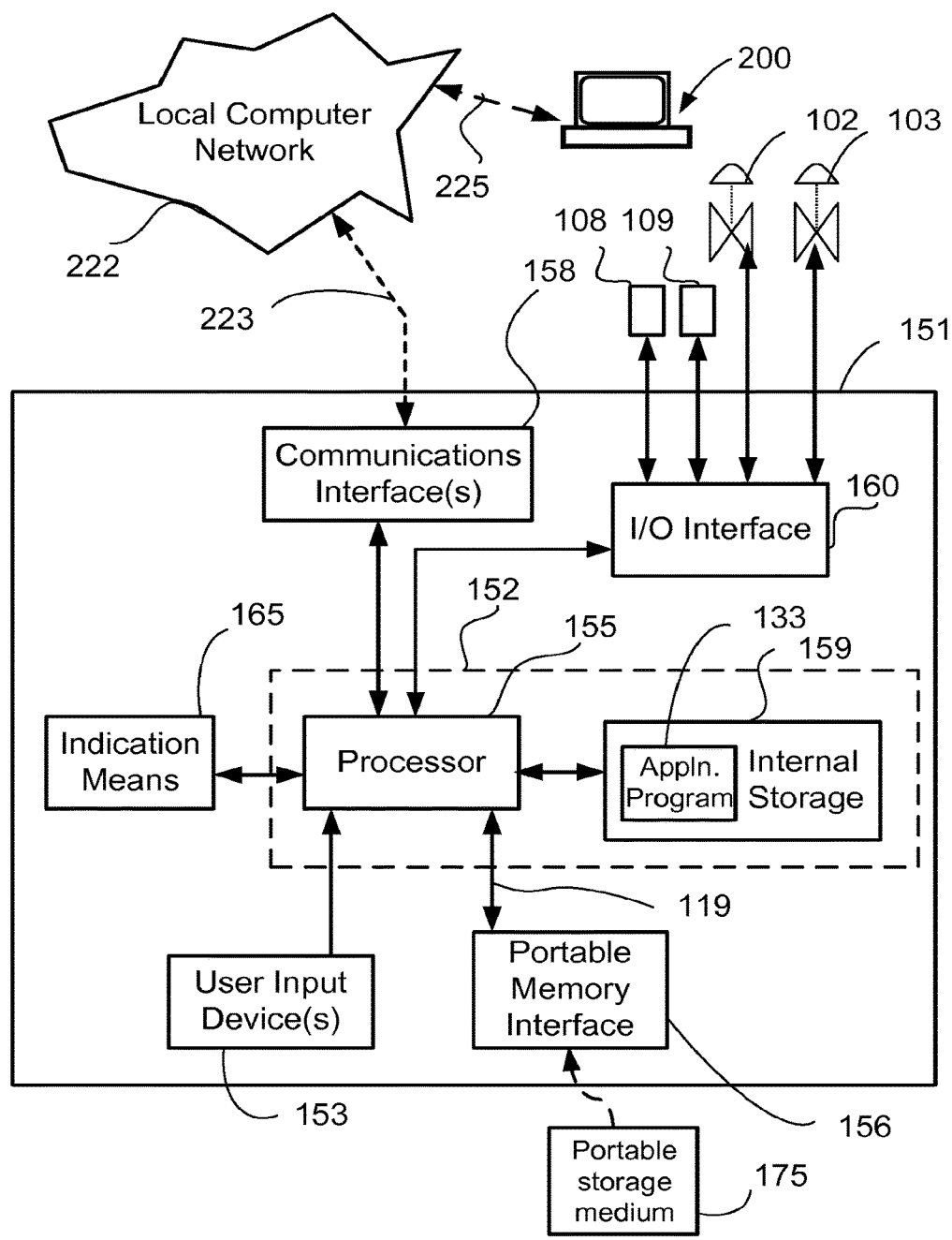
FIG. 2A is a schematic block diagram of an electronic device of the system of FIG. 1.

The system 100 is controlled by an electronic device 151 which is electrically connected to the valves 102, 103. The device 151 is also connected to the conductivity sensor 108 and the acoustic sensor array 109 as seen in FIGS. 1 and 2A.

In one embodiment, the device 151 may be a programmable logic controller (PLC). Such a PLC may be electrically connected to the conductivity sensor 108 and the acoustic sensor array 109, via corresponding controllers for processing signals from the corresponding sensor 108 and array 109.

The system 100 uses the acoustic sensor array 109 to measure liquid turbulence inside the pipe 104 in order to detect water to crude oil transition. The system 100 uses the conductivity sensor 108 to measure the conductivity of the liquid inside the pipe 104 in order to detect water to crude oil transition. Accordingly, the conductivity sensor 108 and/or the acoustic sensor array 109 provide a non-invasive method of detecting the transition of water to crude oil in the pipe 104.

As seen in FIG. 1, the device 151 is also connected to a computer system 200 (or computer), via a local computer network 222 (known as a Local Area Network (LAN)). The computer system is seen in detail in FIG. 2B. The computer system 200 allows an operator to activate or de-activate dewatering remotely using one or more controls displayed on a graphical user interface (GUI) represented on a display 214 of the computer system 200, as will be described below. In this instance, the computer system 200 communicates directly with the device 151 which controls the valves 102 and 103.

The system 100 increases the consistency of detecting the transition of water to crude oil in the pipe 104 and removes the dependence of such detection on a human operator. The system 100 reduces demand on the containment system 105 to deal with oil overspill due to late termination of dewatering. The system 100 allows dewatering to be performed remotely from the bulk-storage tank 101, using the computer system 200, by providing an alert when a specified ratio of water to crude oil (e.g., 20:80) has been reached in the pipe 104.

As seen in FIG. 2A, the device 151 comprises an embedded controller 152. Accordingly, the device 151 may be referred to as an "embedded device." In the present example, the controller 152 comprises a processing unit (or processor) 155 which is bi-directionally coupled to an internal storage module 159. The storage module 159 may be formed from non-volatile semiconductor read only memory (ROM) and semiconductor random access memory (RAM). The RAM may be volatile, non-volatile or a combination of volatile and non-volatile memory.

The embedded device 151 may comprise an indication means 165 in form of a liquid crystal display (LCD) panel and/or light emitting diodes (LEDs) or the like. The embedded device 151 also comprises user input devices 153 which are typically formed by a keypad or like controls.

As seen in FIG. 2A, the embedded device 151 also comprises a portable memory interface 156 which is coupled to the processor 155 via a connection 119. The portable memory interface 156 allows a complementary portable memory device 175 to be coupled to the embedded device 151. The portable memory device 175 may act as a source or destination of data or to supplement the internal storage module 159. Examples of such interfaces which permit coupling with portable memory devices such as Universal Serial Bus (USB) RAM, Secure Digital (SD) cards, Personal Computer Memory Card International Association (PCMIA) cards, optical disks and magnetic disks.

The embedded device 151 also comprises a communications interface 158 to permit coupling of the embedded device 151 to the local computer network 222 via a connection 223. The connection 223 may be wired or wireless, such as radio frequency or optical. An example of a wired connection includes USB. Further, an example of wireless connection includes Bluetooth™ type local interconnection, WiFi (e.g., the IEEE802 family, Infrared Data Association (IrDa) and the like.

The embedded device 151 also includes an input/output (I/O) interface 160 for communicating with the conductivity sensor 108 and the acoustic sensor array 109, as seen in FIG. 2A. The embedded device 151 also communicates with the valves 102 and 103 via the I/O interface 160.

The methods described below may be implemented using the embedded controller 152 wherein the processes of FIGS. 3 to 10, to be described, may be implemented as one or more software application programs 133 executable within the embedded controller 152. The embedded device 151 effects an advantageous apparatus for implementing the described methods. In particular, the steps of the described methods are effected by instructions in the software 133 that are carried out within the controller 152. The software instructions may be formed as one or more code modules, each for performing one or more particular tasks.

The software 133 is generally loaded into the controller 152 from a computer readable medium, and is then typically stored in the internal storage module 159, as illustrated in FIG. 2A, after which the software 133 can be executed by the processor 155. As described herein, the application program 133 is typically pre-installed and stored in the ROM by a manufacturer prior to distribution of the embedded device 151. However, in some instances, the software 133 may be supplied to the user encoded on one or more CD-ROM (not shown) and read via the portable memory interface 156 prior to storage in the internal storage module 159 or in the portable memory 175. In another alternative, the software 133 may be read by the processor 155 from the network 222 or loaded into the controller 152 or the portable storage medium 175 from other computer readable media. Computer readable storage media refers to any storage medium that participates in providing instructions and/or data to the controller 152 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 151. Examples of computer readable transmission media that may also participate in the provision of software, application programs, instructions and/or data to the device 151 include radio or infra-red transmission channels as well as a network connection to another computer or networked device, and the Internet or Intranets including e-mail transmissions and information recorded on Websites and the like. A computer readable medium having such software or computer program recorded on it is a computer program product.

Figure 2B:
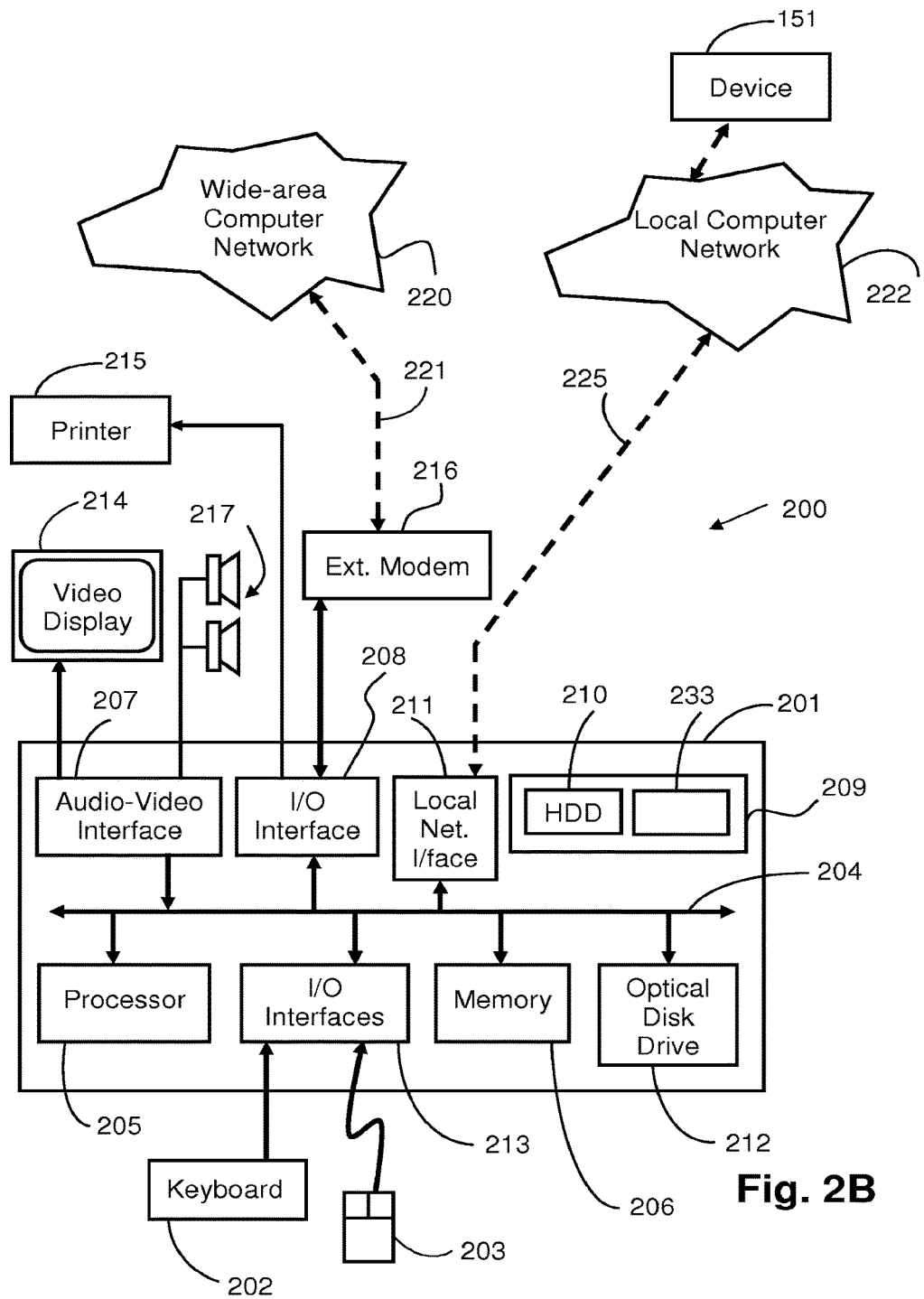
FIG. 2B is a schematic block diagram of a computer system used in the system of FIG. 1.

As seen in FIG. 2B, the computer system 200 is formed by a computer module 201, input devices such as a keyboard 202 and a mouse pointer device 203, and output devices including a printer 215, a display device 214 and loudspeakers 217. An external Modulator-Demodulator (Modem) transceiver device 216 may be used by the computer module 201 for communicating to and from a computer network 220 via a connection 221. The network 220 may be a wide-area network (WAN), such as the Internet or a private WAN. Where the connection 221 is a telephone line, the modem 216 may be a traditional "dial-up" modem. Alternatively, where the connection 221 is a high capacity (eg: cable) connection, the modem 216 may be a broadband modem. A wireless modem may also be used for wireless connection to the network 220.

The computer module 201 typically includes at least one processor unit 205, and a memory unit 206 for example formed from semiconductor random access memory (RAM) and read only memory (ROM). The module 201 also includes an number of input/output (I/O) interfaces including an audio-video interface 207 that couples to the video display 214 and loudspeakers 217, an I/O interface 213 for the keyboard 202 and mouse 203 and optionally a joystick (not illustrated), and an interface 208 for the external modem 216 and printer 215. In some implementations, the modem 216 may be incorporated within the computer module 201, for example within the interface 208. The computer module 201 also has a local network interface 211 which, via a connection 225, permits coupling of the computer system 200 to the local computer network 222. The interface 211 may be formed by an Ethernet™ circuit card, a wireless Bluetooth™ or an IEEE 802.11 wireless arrangement.

The interfaces 208 and 213 may afford both serial and parallel connectivity, the former typically being implemented according to the Universal Serial Bus (USB) standards and having corresponding USB connectors (not illustrated). Storage devices 209 are provided and typically include a hard disk drive (HDD) 210. Other devices such as a floppy disk drive and a magnetic tape drive (not illustrated) may also be used. An optical disk drive 212 is typically provided to act as a non-volatile source of data. Portable memory devices, such optical disks (eg: CD-ROM, DVD), USB-RAM, and floppy disks for example may then be used as appropriate sources of data to the system 200. The memory 206 and the HDD 210 may be referred to as a "computer readable memory".

The components 205 to 213 of the computer module 201 typically communicate via an interconnected bus 204 and in a manner which results in a conventional mode of operation of the computer system 200 known to those in the relevant art. Examples of computers on which the described arrangements can be practised include IBM-PC's and compatibles, Sun Sparcstations, Apple Mac™ or alike computer systems evolved therefrom.

One or more steps of the methods described below may be implemented within the computer system 200, wherein one or more steps of the processes of FIGS. 3 to 6 may be implemented as software, such as one or more software application programs 233 executable within the computer system 200. In particular, one or more of the steps of the described methods may be effected by instructions in the software 233 that are carried out within the computer system 200. The instructions may be formed as one or more code modules, each for performing one or more particular tasks. The software 233 executable within the computer system 200 may implement and manage the graphical user interface (GUI) displayed on the display 214. As described above, one or more controls displayed on the GUI allow an operator to activate or de-activate dewatering remotely.

Again, the software 233 resident on the computer system 200 and implementing GUI may be stored in a computer readable medium, including the storage devices described above, for example. Such software may be loaded into the computer system 200 from the computer readable medium, and then be executed by the computer system 200. The use of a computer program product in the computer system 200 preferably effects an advantageous apparatus for implementing one or more steps of the described methods.

Through manipulation of the keyboard 202 and the mouse 203, the operator of the system 100 and the software application 233 may manipulate the graphical user interface (GUI) to provide controlling commands and/or input to the software application 133 resident on the embedded device 151, see FIG. 2A. The controlling commands and/or input may allow the operator to activate and de-activate dewatering remotely using the controls displayed on the GUI represented on the display 214, FIG. 2B. The GUI preferably also provides an indication of the status of the system 100 (e.g., "valve open" or "valve closed") to indicate whether the valves 102 and 103 are open or closed, FIG. 1. The GUI may also display diagnostic information indicating problems with the system 100.

A method 300 of dewatering the bulk-storage tank 101 will now be described in detail below with reference to FIG. 3. The method 300 may be implemented as one or more code modules of the software 133 resident on the internal storage 159 of the embedded device 151 and being controlled in its execution by the processor 155.

The method 300 begins at step 301 where the processor 155 performs the step of transmitting a first signal to the motorised valve 102 to open the valve 102 allowing liquid to flow out of the tank 101 through the pipe 104. Liquid flows from the tank 101 through the open valve 102 and the pipe 104 to the containment system 105. The first signal may be generated by the embedded device 151 in response to a signal received from computer system 200. As described above, the signal received from the computer system 200 may be generated based on operator manipulation of the keyboard 202 and the mouse 203 to operate one or more controls of the GUI displayed on the display device 214. In response to such manipulation, the software 233 may generate and send the first signal to the device 151 via the network 222.

At the next step 303, the processor 155 performs the step of detecting if the liquid flowing in the pipe 104 at a predetermined point in the pipe has transitioned from water to crude oil. As described in detail below, the processor 155 may detect whether the liquid flowing in the pipe 104 has transitioned from water to crude oil by measuring at least one property of the liquid flowing at the predetermined point within the pipe 104. The measured property may be compared to a predetermined threshold value. Based on a result of the comparison, the processor 155 may detect if the liquid flowing in the pipe has transitioned from water to crude oil.

In one example, the processor 155 may determine if the flow of liquid within the pipe 104 is "laminar" or "turbulent" at the predetermined point, at any particular point in time, based on a measurement of sound pressure level (SPL) produced by the liquid flowing within the pipe 104. Accordingly, the property measured at step 303 is sound pressure level (SPL) produced by the liquid flowing within the pipe 104. The determination of sound pressure level may be made using the acoustic sensor array 109 positioned at the predetermined point of the pipe 104. A method 400 of detecting water to crude oil transition in the pipe 104 using the acoustic sensor array 109, as may be executed at step 303, will be described in detail below with reference to FIG. 4.

Alternatively, the processor 155 may detect whether the flow of liquid in the pipe 104 has transitioned from water to crude oil by determining the conductivity of the liquid using the conductivity sensor 108. Accordingly, the property measured at step 303 is conductivity of the liquid. A method 500 of detecting water to crude oil transition in the pipe 104 using the conductivity sensor 108, as may be executed at step 303, will be described in detail below with reference to FIG. 5.

In still another alternative, the processor 155 may detect whether the flow of liquid in the pipe 104 has transitioned from water to crude oil by monitoring vibration within the pipe 104 using an accelerometer, as will be described below. Accordingly, in this instance, the property measured at step 303 is vibration caused by the liquid flowing in the pipe 104.

The method 300 continues at the next step 304, where if the flow of liquid in the pipe 104 at the predetermined point has transitioned from water to crude oil (i.e., the transition has occurred), then the method 300 proceeds to step 305. Otherwise, the method 300 returns to step 303. At step 305, the processor 155 performs the step of transmitting a signal to the motorised valve 102, via the I/O interface 160, to close the valve 102 in order to stop the liquid flowing out of the tank 101 in the pipe 104. The closing of the valve 102 may be indicated to the operator via the GUI displayed on the display device 214, in response to a further signal received by the processor 205 from the processor 155.

At low flow rates, liquid tends to be laminar. As the flow rate of liquid speeds up, a transition occurs and the liquid crinkles up into complicated, random turbulent flow. Turbulent flowing liquid, while proceeding in a particular direction like laminar flowing liquid, has the added complexity of random velocity fluctuations. Flow patterns of turbulent flowing liquid are chaotic.

As an example of laminar flow, consider water flowing from a tap. At low flow rates, a glassy, orderly flow of water may be observed flowing from the tap. If there is no wind or other disturbance, nothing will change and the orderly flow of water will continue. Laminar flowing water is deterministic. Information about future behaviour of laminar flowing water is completely determined by specification of flow at an earlier time. For faster or larger scale water flowing from the tap (e.g., with the tap fully open), the flow pattern of water continuously changes. Although, average motion of the faster flowing water is in one direction within the flow there are irregularities everywhere within the flowing water.

As the velocity of a liquid, V, increases, transition from laminar flow to turbulent flow will occur.

Now consider using crude oil in place of water. Assuming a large enough pressure could be provided, even for "fast" flowing crude oil, the motion of the crude oil remains laminar.

Further, consider a nozzle on a tap and constrict water flow into a fine glass capillary tube. In this instance, the flow can be made to go quite fast without the flow becoming turbulent.

Laminar flow of liquid occurs for low speeds, small diameters, low densities and high viscosities. Turbulent flow of liquids occurs for the opposite conditions (i.e., high speeds, large diameters, high densities and low viscosities).

Viscosity is a measurable property of a liquid. Some other examples of measurable properties of liquids are conductivity, density and temperature. Other examples of a measurable property of a liquid are sound pressure level (SPL) and vibration, both produced by the liquid flowing within a pipe.

The term "kinematic viscosity" (units cSt or $m^2s^{-1}$) of a liquid refers to the viscosity of the liquid divided by the density of the liquid.

In fluid mechanics, a value known as the Reynolds number, Re, quantifies the relative importance of inertial forces to viscous forces for a given liquid and given flow conditions. The Reynolds number for a liquid may be determined in accordance with Equation (1) below:

$$Re = \frac{\rho V d}{\mu} = \frac{V d}{v} \qquad \text{Equation (1)}$$

$\mu$ is the dynamic visccosity, and $v$ is the kinematic visccosity where V represents speed of the liquid in meters per second ($ms^{-1}$) flowing through an orifice (e.g., inner diameter of a pipe) of diameter d in meters (m); µ represents absolute dynamic fluid viscosity in Newton seconds per meter squared ($Nsm^{-2}$); v represents kinetic fluid viscosity in meters squared per second ($m^2s^{-1}$); and ρ represents density of the liquid in kilograms per meter cubed ($kg\ m^{-3}$).

If the speed of the liquid, V, or diameter, d, (or both the speed and the diameter) are small and the viscosity is large, the Reynolds number Re is small. In this instance, the flow of the liquid will be laminar. Increasing the diameter, d, or the speed, V, or decreasing the viscosity, will increase the Reynolds number, Re.

For any type of fluid, flowing at any speed, V, in any pipe of diameter, d, flow of the liquid in the pipe, remains laminar for a Reynolds number, Re, less than approximately two-thousand-three-hundred (2300). For a Reynolds number, Re, greater than two-thousand-three-hundred (2300), turbulence occurs in the flowing liquid.

As seen in Table 1 of Appendix A, the kinematic viscosity of water at 54.4° C. is approximately 0.55 cSt or 550×10³ $m^2s^{-1}$. In contrast, the kinematic viscosity of crude oil at 54.44° C. is approximately 3.5 cSt. If the pipe diameter is one (1) cm, the speed, V, at which the Reynolds number, Re, is two-thousand (2000), is 0.2 ms$^{-1}$ (0.72 kmh-1) which is a relatively slow speed. Water undergoes transition to turbulence at low speeds.

While the transition from laminar to turbulent flow occurs at a threshold Reynolds number, Re, of approximately two-thousand-three-hundred (2300) in a pipe (e.g., the pipe 104), the precise value of the threshold Reynolds number depends on whether any small disturbances are present. If the inner surface of the pipe is very smooth and there are no disturbances to the velocity, higher values of the Reynolds number, Re, can be obtained with the flow still in a laminar state. However, if the Reynolds number, Re, is less than two-thousand-three-hundred (2300), then the flow of the liquid will be laminar even if the liquid is disturbed. Further, if the pipe has a different cross-sectional geometry (e.g., square), or the flow of liquid is over a turbine blade, then the transition from laminar to turbulent flow will occur at different Reynolds number values, Re.

When the flow of liquid is turbulent, the liquid contains eddying motions of all sizes. Further, a large part of the mechanical energy in the turbulent flow goes into the formation of these eddies, which eventually dissipate their energy as heat and noise. As a result, at a given Reynolds number, Re, the drag of a turbulent flow is higher than the drag of a laminar flow. Also, turbulent flow is affected by surface roughness, so that increasing roughness of a surface increases the drag. The relationship between turbulent flow and drag is important to tailoring the value of the Reynolds number, Re, for a given system (e.g., the system 100).

The kinematic viscosity of crude oil and water is substantially different, as seen in Appendix A. As a result, the difference between the laminar flow of crude oil and the turbulent flow of water in the pipe 104 may be detected using acoustic means in the form of the acoustic sensor array 109 attached to the pipe 104. Any sounds and vibrations in the pipe 104, caused by turbulence of the liquid, indicate that the liquid flowing through the pipe 104 is water. In contrast, relative silence and stillness within the pipe 104, when liquid is flowing through the pipe 104, indicates the laminar flow of crude oil within the pipe 104.

Figure 6:
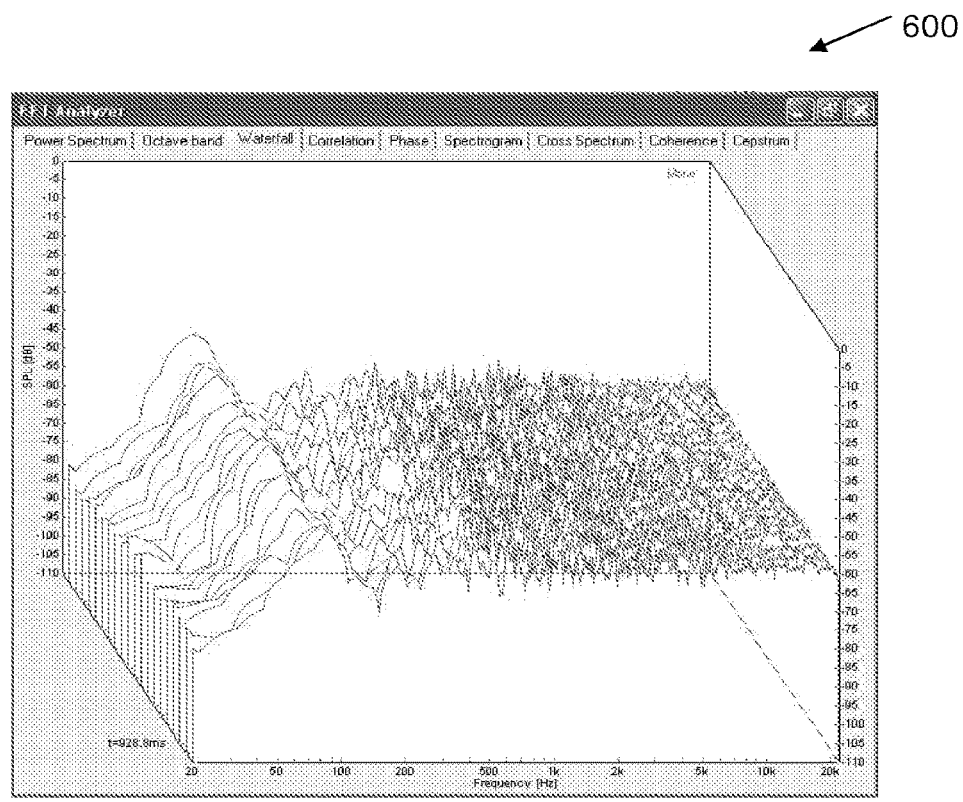
FIG. 6 shows a fast Fourier transform (FFT) waterfall trace simulating the flow of water through the pipe of the system of FIG. 1.

As an example, FIG. 6 shows a fast Fourier transform (FFT) waterfall trace 600 simulating the flow of water through the pipe 104. The trace 600 comprises a vertical axis showing sound pressure level (SPL) in decibels (dB). The horizontal axis of the trace 600 shows frequency in Hertz (Hz). The spectrum of the trace 600 is chaotic and resembles white noise. Of note in the trace 600 is the role off of the recorded signals below 100 Hz. This role off is an artifact of the recording equipment used to generate the trace 600 and would unlikely be present in a typical implementation of the system 100.

Figure 7:
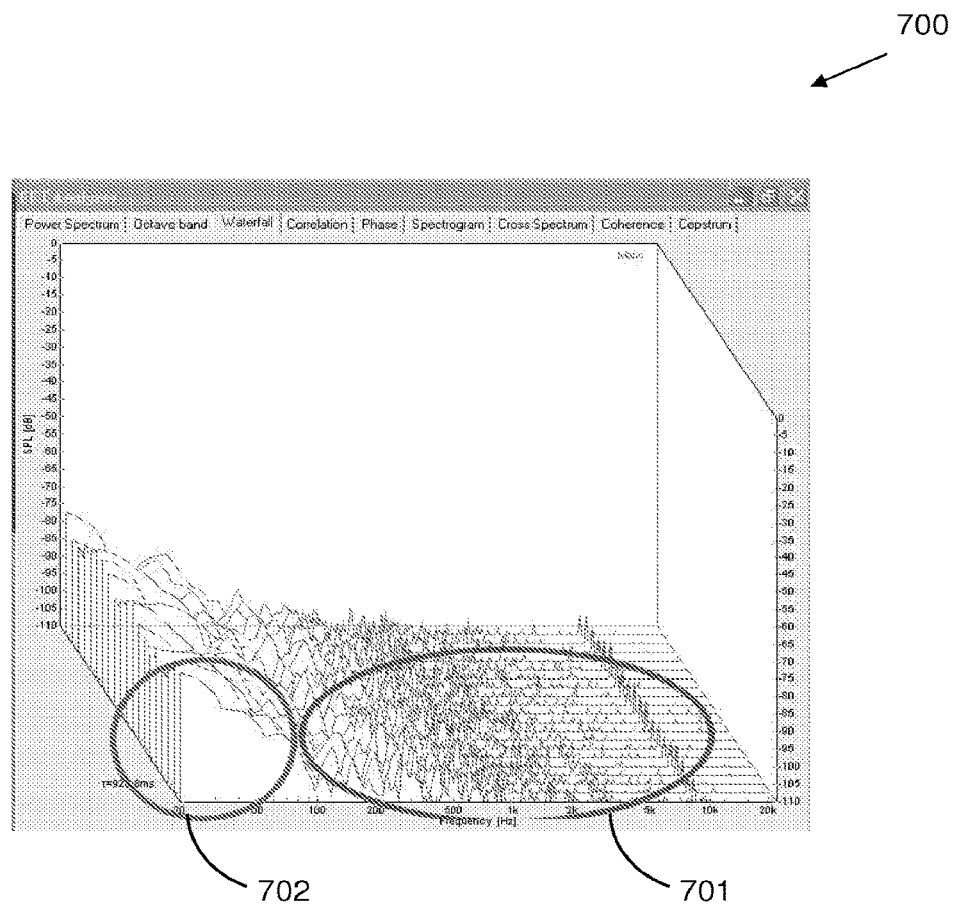
FIG. 7 shows a fast Fourier transform (FFT) waterfall trace simulating the flow of crude oil through the pipe of the system of FIG. 1.

FIG. 7 shows a fast Fourier transform (FFT) waterfall trace 700 simulating the flow of crude oil through the pipe 104. Again, the trace 700 comprises a vertical axis showing sound pressure level (SPL) in dB. The horizontal axis shows frequency in Hz. As seen in FIG. 7, the amplitude of signal above 100 Hz, as highlighted by oval 701, is small compared to the trace 600. The overall difference in SPL between the trace 600 and the trace 700 is approximately fifty (50) dB. Accordingly, the flow of crude oil within the pipe 104 may be distinguished from the flow of water within the pipe 104 by measuring the SPL using the acoustic sensor array 109 and comparing the measured level of SPL to a first predetermined threshold value. Determination of the first predetermined threshold value will be described in detail below and may be stored in the memory 206 or on the hard disk drive 210. The area of the trace 700 highlighted by a circle 702 in the trace 700 is a combination of environmental noise and artifact of the equipment used to generate the trace 700.

The method 400 of detecting water to crude oil transition in the pipe 104 using the acoustic sensor array 109, as may be executed at step 303, will now be described in detail below with reference to FIG. 5. As described above, the acoustic sensor array 109 is fixed at a predetermined point to the outside of the pipe 104. The method 400 may be implemented as one or more code modules of the software 133 resident on the storage module 159 of the embedded device 151 and being controlled in its execution by the processor 155.

The method 400 will be described by way of example with reference to FIG. 9 which shows a graph 900 representing sound pressure level (SPL) versus time for a typical dewatering scenario. The method 400 detects water to crude oil transition based on a baseline ambient SPL within the pipe 104. The processor 155 of the embedded device 151 may be configured to pole the acoustic sensor array 109 periodically (e.g., every second) to determine an SPL reading. Prior to commencement of dewatering at step 301 (i.e., prior to time t0 in the graph 900), the software 133 (under execution of the processor 155) determines the baseline ambient SPL by determining output of the acoustic sensor array 109 at that time. The determined ambient SPL may be stored in the RAM of the storage module 159 as a two dimensional (2D) data object.

The method 400 begins at step 401, where the processor 155 determines the sound pressure level (SPL) measured in the pipe 104 at a current time. As seen in FIG. 9, dewatering of the tank 101 commences at time t0 with the opening of the motorised valve 102, as at step 301 of the method 300. The opening of the valve 102 represents a step stimulus to the system 100 as the SPL measured in the pipe 104 begins to rise. The rising SPL will typically plateau, as at point A of the graph 900. The plateau represents turbulent flow of liquid within the pipe 104 and will last for a period from time t0 to t1 at which time transition from water to crude oil commences. The plateau occurring at point A may be referred to as the "turbulent plateau". The period from time t0 to t1 will be as long as the discharge of water continues in the pipe 104. Accordingly, in the initial execution of the method 400, the SPL measured in the pipe 104 at step 401 will be a value between the ambient SPL and the SPL level at the turbulent plateau of the graph 900.

The current value of SPL in the pipe 104 may be read by the processor 155 at step 401 from the RAM of the internal storage module 159. Alternatively, the processor 155 may be configured to pole the acoustic sensor array 109 at the current time (i.e., real time capture) to determine the SPL reading. In another alternative, the processor 155 may be configured to record (i.e., capture and store) the signal (representing SPL) from the acoustic sensor array 109 for a predetermined period (e.g., sixty seconds). The processor 155 may also process the signal from the acoustic sensor 109 using cross correlation and FFT analysis and compare the determined values of SPL against previously learned (and stored) values.

In one implementation, the processor 155 may be configured to implement a learning algorithm so that the system 100 may self adapt over a period of time to each new installation of the system 100, as the frequency response of no two mechanical systems is exactly identical. For example, the system 100 may be configured to vary weightings associated with the acoustic sensor 109 and the conductivity sensor 108.

Figure 9:
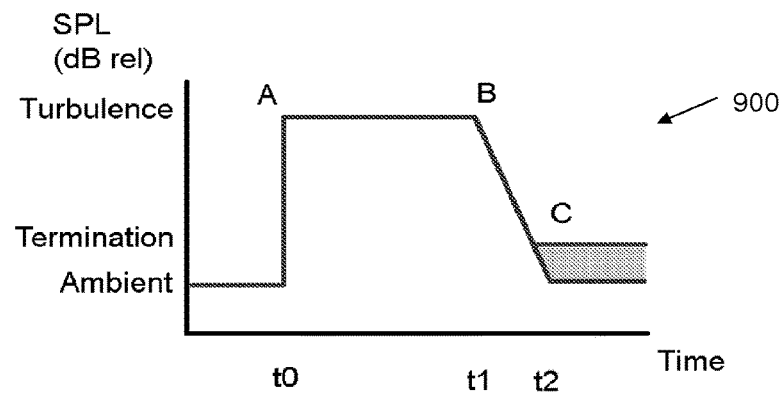
FIG. 9 is a graph showing sound pressure level (SPL) versus time, in accordance with a dewatering example.

Returning to the example of FIG. 9, at time t1, the transition from water to oil commences, resulting in a knee (as at point B) on the graph 900. As the transition continues following time t1, the rag interface layer separating the water and oil in the tank will be discharged typically resulting in a variable but reducing level of turbulence (i.e., reducing SPL) until time t2. At time t2, the majority of liquid flowing in the pipe 104 will be crude oil and the turbulence measured in the pipe 104 (i.e., represented by measured SPL) will plateau at a lower level. This lower level plateau represents laminar flow of liquid in the pipe 104 and may be referred to as the "termination plateau". The ratio of water to crude oil in the liquid at the termination plateau will typically be around 20:80. Accordingly, point C on the graph 900 represents the point at which the valve 102 is closed, as at step 305 of the method 300, in order to stop the liquid flowing out of the tank 101 into the pipe 104. Point C may be referred to as the "termination point".

The difference between the baseline ambient SPL and SPL level at the turbulent plateau will typically be around 40 dB. However, this difference may vary significantly depending on the implementation of the system 100 and the liquid flowing in the pipe 104.

The difference between the SPL level at the turbulent plateau and the SPL level at the termination plateau will typically be between 30 dB and 40 dB. Accordingly, the SPL level at the termination plateau will be close to the baseline ambient SPL. In this instance, the first predetermined threshold used for detecting if the liquid flowing in the pipe 104 has transitioned from water to crude oil may be set to 10 dB above the ambient baseline level. Again, the difference between the SPL level at the turbulent plateau and the SPL level at the termination plateau may vary significantly depending on the implementation of the system 100 and the liquid flowing in the pipe 104. The first predetermined threshold may be determined by the processor 155 prior to commencement of the method 300 and stored in the internal storage module 159.

Returning to the method 400, at the next step 403, if the processor 205 determines that the SPL at the current time is less than or equal to the first predetermined threshold value, indicating laminar flow within the pipe 104, then the method 400 proceeds to step 405. Otherwise, the method 400 returns to step 401. Steps 401 and 403 may occur many times between time t0 and time t2 on the graph 900.

At step 405, the processor 155 determines that the transition from water to crude oil has occurred. The processor 155 may set a flag, for example, configured within the internal storage module 159 in order to indicate that the transition has occurred. Accordingly, at step 303, the processor 155 may detect whether the flow of liquid in the pipe 104 has transitioned from water to crude oil by determining the state of the flag.

The SPL value determined at step 401 may represent an average (or Mean) SPL value dynamically determined by the processor 155 for a moving window of readings (e.g., 10 successive readings). The reason for using an average SPL value is to discount random noise and smooth the determined SPL data. The processor 155 may also be configured to determine a running standard deviation of the average SPL values.

Figure 10:
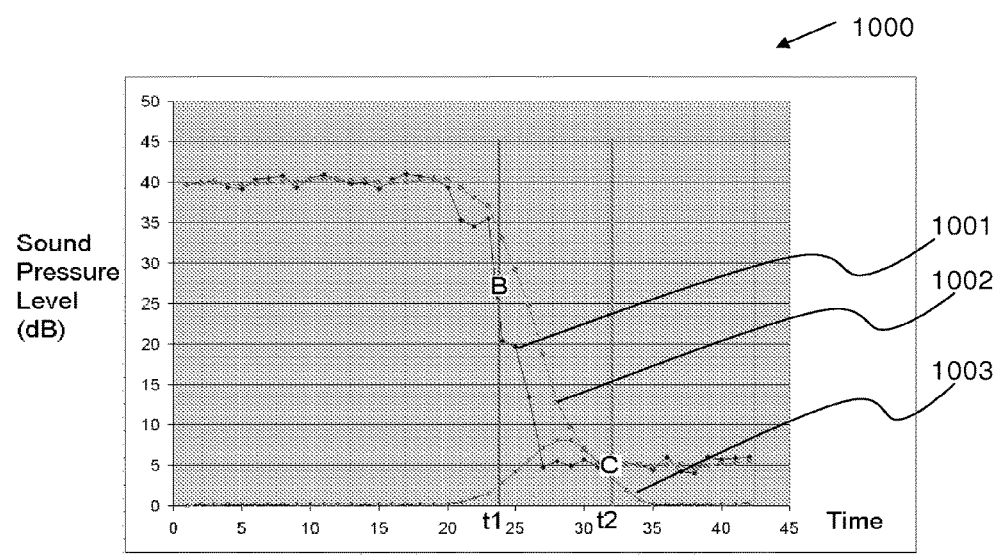
FIG. 10 is a graph showing sound pressure level (SPL) versus time, in accordance with a dewatering example.

FIG. 10 is a graph 1000 showing SPL values against time in accordance with one example. The graph 1000 is similar to the graph 900. As seen in FIG. 10, trace 1001 plots raw SPL values, trace 1002 plots average (or mean) SPL values, and trace 1003 plots the standard deviation of the windowed average SPL values. Point B (occurring at time t1) on the graph 1000 substantially corresponds to point B (i.e., the knee) on the graph 900. Point B on the graph 1000 may initially be determined by the processor 155 from a variation in standard deviation data (as represented by trace 1003) greater than three times the running average standard deviation (as represented by trace 1002). This three times factor may be refined as part of the learning algorithm.

Point C (i.e., the point at which the termination plateau begins at time t2) on the graph 1000 corresponds to point C on the graph 900. In one implementation of the system 100, point C may be determined and refined by the processor 155, as at step 405, based on decline in standard deviation (as represented by trace 1003) to 50% of the maximum value of standard deviation variation subsequent to point B. As seen in FIG. 10, point C corresponds to the point on trace 1003 where the variation in standard deviation has dropped to 50% of its maximum value subsequent to point B. Once point C is determined by the processor 155 in this manner, the processor 155 performs the step 305 of transmitting a signal to the motorised valve 102, via the I/O interface 160, to close the valve 102 in order to stop the liquid flowing out of the tank 101 in the pipe 104. Accordingly, the determination at step 405 of whether the transition from water to crude oil has occurred may be made by determining when the variation in standard deviation has dropped to 50% of its maximum value subsequent to point B. In this instance, step 403 of the method 400 may be described as a determination by the processor 155 of whether an "SPL Function" is at the threshold. The term SPL Function here refers to each of a measured SPL value as described above; an average (or Mean) SPL value dynamically determined for a moving window of readings (e.g., 10 successive readings); and a running standard deviation of the average SPL values.

As described above, the processor 155 may also be configured to implement a learning algorithm so that the system 100 may self adapt over a period of time to each new installation of the system 100. For the acoustic sensor array 109, in one implementation, the following system variables may be recorded into a history file stored within the internal storage module 159 to allow reinforced learning to take place, relative to time t0:
 (i) "t1"—the time at which the standard deviation of the SPL increases by a factor of 3;
 (ii) "t2"— the time at which the standard deviation of the SPL decreases by 50%;
 (iii) Ambient SPL;
 (iv) Mean SPL between time "t0" and time "t1"; and
 (v) Mean SPL after "t2".

As seen in FIG. 10, the methods described above introduce a minimal amount of lag into the system 100. However, the learning algorithm may account for this lag by applying weightings to the determined SPL values to ensure that point B occurs as close as possible to the actual beginning of the transition from water to crude oil. In this connection, in probability theory and statistics, standard deviation is a measure of the variability or dispersion of a population, a data set, or a probability distribution. A low standard deviation indicates that the data points tend to be very close to the same value (the mean), while high standard deviation indicates that the data are "spread out" over a large range of values.

The standard deviation of a discrete random variable is the root-mean-square (RMS) deviation of its values from the mean. If the random variable X takes on N values $x_1 \ldots x_N$ (which are real numbers) with equal probability, then the standard deviation σ of the variable X may be determined by finding the mean, $\bar{x}$, of the values $x_1 \ldots x_N$, determining the deviation ($x_i - \bar{x}$) from the mean for each value $x_i$, determining the squares of these deviations, determining variance $\sigma^2$ representing the mean of the squared deviations, and determining the square root of the variance. Accordingly, the standard deviation σ of the variable X may be determined in accordance with Equation 2 as follows:

$$\sigma = \sqrt{\frac{1}{N}\sum_{i=1}^{N}(x_i - \bar{x})^2}, \quad \text{Equation 2}$$

where $\bar{x}$ is the arithmetic mean of the values $x_i$, defined in accordance with Equation 3, as follows:

$$\bar{x} = \frac{x_1 + x_2 + \ldots + x_N}{N} = \frac{1}{N}\sum_{i=1}^{N}x_i. \quad \text{Equation 3}$$

The learning algorithm may be based on comparison of the SPL data values in the history file stored within the internal storage module 159. The learning algorithm may be parameterised using the mean SPL values from previous dewatering processes, with SPL values beyond the mean by more than two standard deviations being ignored.

During actual execution of the method 300, the operator may be notified by way of the GUI displayed on the display device 214, that the dewatering currently underway is atypical, where the actual determined SPL values are above the mean by more than two standard deviations.

The learning algorithm may also compare data determined using the acoustic sensor array 109 to equivalent data determined using the conductivity sensor 108, in order to correct the determination of points B and C on the graph 1000. Electrical conductivity is measured in Siemens per meter (Sm-1). As seen in Appendix B, water has a conductivity ranging from pure water at $5.5 \times 10^{-6}$ Sm$^{-1}$ to sea water with a conductivity of 5 Sm$^{-1}$. Depending on contamination levels, crude oil exhibits conductivity tending towards that of pure water. In particular, depending on source of the crude oil, the conductivity ranges from between $35 \times 10^{-6}$ Sm$^{-1}$ to $110 \times 10^{-6}$ Sm$^{-1}$. Accordingly, crude oil may be distinguished from contaminated water passing through a non-contact conductivity sensor such as the conductivity sensor 108.

The method 500 of detecting water to crude oil transition in the pipe 104, using the conductivity sensor 108, as may be executed at step 303, will now be described in detail with reference to FIG. 5. As described above, the conductivity sensor 108 is positioned at a predetermined point within the pipe 104. The method 500 may be implemented as one or more code modules of the software 133 resident in the storage module 159 of the embedded device 151 and being controlled in its execution by the processor 155.

The method 500 will be described by way of example with reference to FIG. 11 which shows a graph 1100 representing conductivity Siemens per meter (Sm-1) versus time for a typical dewatering scenario. The method 500 detects water to crude oil transition based on a baseline ambient conductivity value within the pipe 104. The processor 155 of the embedded device 151 may be configured to pole the conductivity sensor 108 periodically (e.g., every second) to determine a conductivity reading. Prior to commencement of dewatering at step 301 (i.e., prior to time t0 in the graph 1100), the software 133 (under execution of the processor 155) determines a baseline ambient conductivity value by determining a current output of the conductivity sensor 108. The determination of the baseline ambient conductivity value allows for any plaque on the sensor 108 from any previous dewatering processes. The determined ambient conductivity value may be stored in the RAM of the storage module 159 as a two dimensional (2D) data object.

The method 500 begins at step 501, where the processor 155 determines conductivity of the liquid in the pipe 104 at a current time. As seen in FIG. 11, dewatering of the tank 101 commences at time t0 with the opening of the motorised valve 102, as at step 301 of the method 300. The opening of the valve 102 represents a step stimulus to the system 100 as the conductivity value measured in the pipe 104 begins to rise. The rising conductivity will typically plateau, as at point A of the graph 1100. The plateau represents turbulent flow of liquid within the pipe 104 and will last for a period from time t0 to t1 at which time transition from water to crude oil commences. Again, the plateau occurring at point A of the graph 1100 may be referred to as the "turbulent plateau". The period from time t0 to t1 will be as long as the discharge of water continues in the pipe 104.

Similar to the method 400, in the initial execution of the method 500, the conductivity values measured in the pipe 104 at step 501 will be a value between the baseline ambient conductivity value and the conductivity value at the turbulent plateau on the graph 1100. The conductivity reading may be stored in RAM of the internal storage module 159. In this instance, at step 501, the current value of conductivity may be read by the processor 155 from the RAM of the internal storage module 159. Alternatively, the processor 155 may be configured to pole the conductivity sensor 108 at the current time to determine the conductivity reading. In another alternative, the processor 155 may be configured to record the signal (representing conductivity value) from the conductivity sensor 108 for a predetermined period (e.g., sixty seconds).

Figure 11:
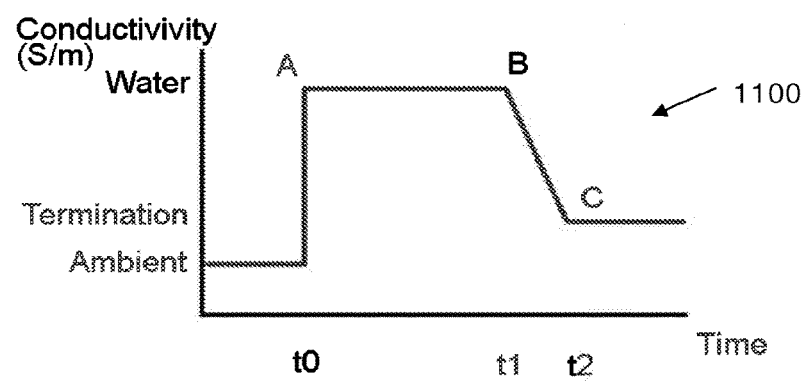
FIG. 11 is a graph showing conductivity versus time, in accordance with a dewatering example.

Returning to the example of FIG. 11, at time t1, the transition from water to oil commences, resulting in a knee (at point B) on the graph 1100. As the transition continues following time t1, the rag interface layer separating the water and oil in the tank 101 will be discharged typically resulting in a variable but reducing level of conductivity (i.e., reducing Sm-1) until time t2. At time t2, the majority of liquid flowing in the pipe 104 will be crude oil and the conductivity measured in the pipe 104 will plateau at a lower level. This lower level plateau represents laminar flow of liquid in the pipe 104 and, again, may be referred to as the "termination plateau" similar to the graph 900. Accordingly, point C on the graph 1100 represents the point at which the valve 102 is closed, as at step 305 of the method 300, in order to stop the liquid flowing out of the tank 101 in the pipe 104.

The difference between the baseline ambient conductivity value and the conductivity value at the turbulent plateau will typically range from 1 Sm$^{-1}$ to 5 Sm$^{-1}$. However, this difference may vary significantly depending on the implementation of the system 100 and the liquid flowing in the pipe 104.

The conductivity of crude oil relative to water may be approximated to zero. As such, the system 100 may be configured so that the termination point (i.e., point C on the graph 1100) is reached when mean conductivity of the liquid in the pipe 104 drops to 20% of the difference between the baseline ambient conductivity value and the conductivity value at the turbulent plateau of the graph 1100 (i.e., 0.2 $Sm^{-1}$ to 1 $Sm^{-1}$). Accordingly, the difference between the conductivity value at the turbulent plateau and the conductivity value at the termination plateau will typically range between 0.8 $Sm^{-1}$ to 4 $Sm^{-1}$. The conductivity value at the termination plateau will be close to the baseline ambient conductivity value. In this instance, a second predetermined threshold used for detecting if the liquid flowing in the pipe 104 has transitioned from water to crude oil may be set to 20% above the ambient baseline conductivity value. Again, the difference between the conductivity value at the turbulent plateau and the conductivity value at the termination plateau may vary significantly depending on the implementation of the system 100 and the liquid flowing in the pipe 104. In one implementation of the system 100, the second predetermined threshold may be set to 0.01 $Sm^{-1}$.

Returning to the method 500, at the next step 503, if the processor 155 determines that the conductivity of the liquid at the current time is less than or equal to the second predetermined threshold value, indicating that the liquid flowing within the pipe 104 is oil, then the method 500 proceeds to step 505. Otherwise, the method 500 returns to step 501.

Steps 501 and 503 may occur many times between time t0 and time t2 on the graph 1100. The second predetermined threshold value may be stored in the internal storage module 159 of the device 151.

At step 505, the processor 205 determines that the transition from water to crude oil has occurred. Again, the processor 205 may set a further flag described above, for example, configured within the memory 206 in order to indicate that the transition has occurred. Accordingly, at step 303, the processor 205 may detect whether the flow of liquid in the pipe 104 has transitioned from water to crude oil by determining the state of the further flag.

In one implementation, the system 100 may be configured so that the conductivity of the liquid must be less than or equal to the second predetermined threshold value for a predetermined period (e.g., sixty seconds), before the method 500 proceeds to step 505 and the processor 155 determines that the water has transitioned to crude oil.

As described above, the processor 155 may also be configured to implement a learning algorithm so that the system 100 may self adapt over a period of time to each new installation of the system 100. For the conductivity sensor 108, the following system variables may be recorded into a history file stored within the internal storage 159 to allow reinforced learning to take place, relative to time t0:
  (i) "t1"—the time at which a running mean of sixty (60) conductivity readings drops by 20% from the conductivity value at the turbulence plateau;
  (ii) "t2"—the time at which the conductivity value has fallen to 20% of the conductivity value at the turbulence plateau (i.e., the second predetermined threshold). In one implementation, variable "t2" may represent the time at which the conductivity has fallen to or less than the second predetermined threshold value for a predetermined period (e.g., sixty seconds);
  (iii) Ambient conductivity;
  (iv) Mean conductivity between time "t0" and time "t1"; and
  (v) Mean conductivity at "t2".

For the conductivity sensor 108, the learning algorithm may be based on comparison of the conductivity values in a history file stored within the internal storage module 159. The learning algorithm may be parameterised using the mean values from previous dewatering processes, with conductivity values beyond the mean by more than two standard deviations being ignored. Again, during actual execution of the method 300, the operator may be notified by way of the GUI displayed on the display device 214, that the dewatering currently underway is atypical, where the actual determined conductivity values above the mean by more than two standard deviations are ignored.

The learning algorithm may also compare conductivity data values determined using the conductivity sensor 108 to equivalent data determined using the acoustic sensor array 109, in order to correct the determination of points B and C on the graph 1100.

Once the water has been removed from the bulk-storage tank 101, the valve 105 may be opened to send the crude oil to the transport system 107.

Figure 3:
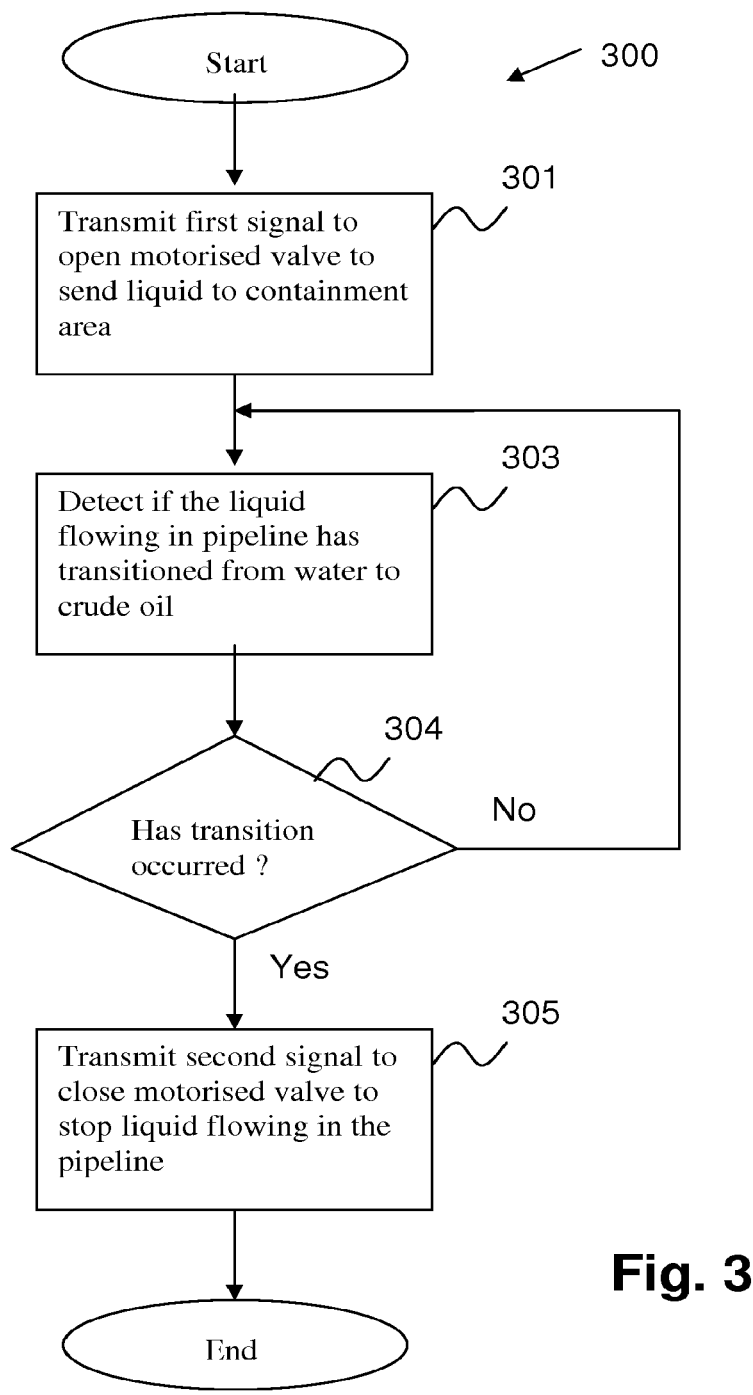
FIG. 3 is a flow diagram showing a method of dewatering the bulk-storage tank of FIG. 1.
Figure 4:
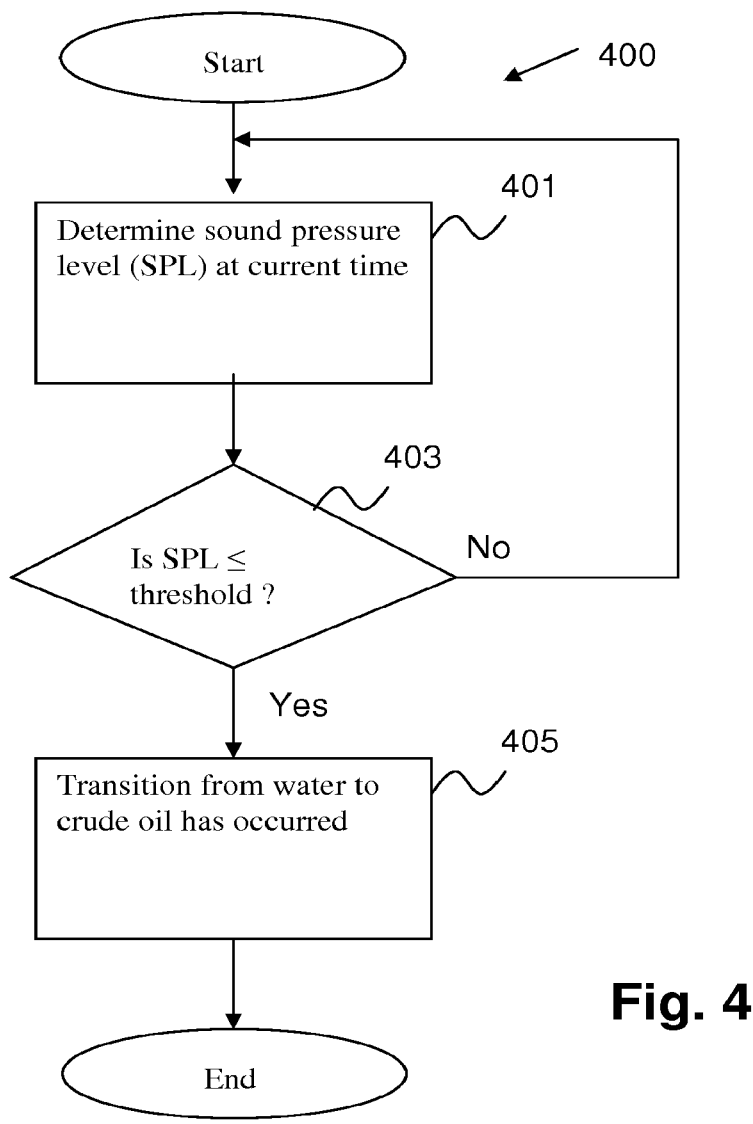
FIG. 4 is a flow diagram showing a method of detecting water to crude oil transition in a pipe of the system of FIG. 1.
Figure 5:
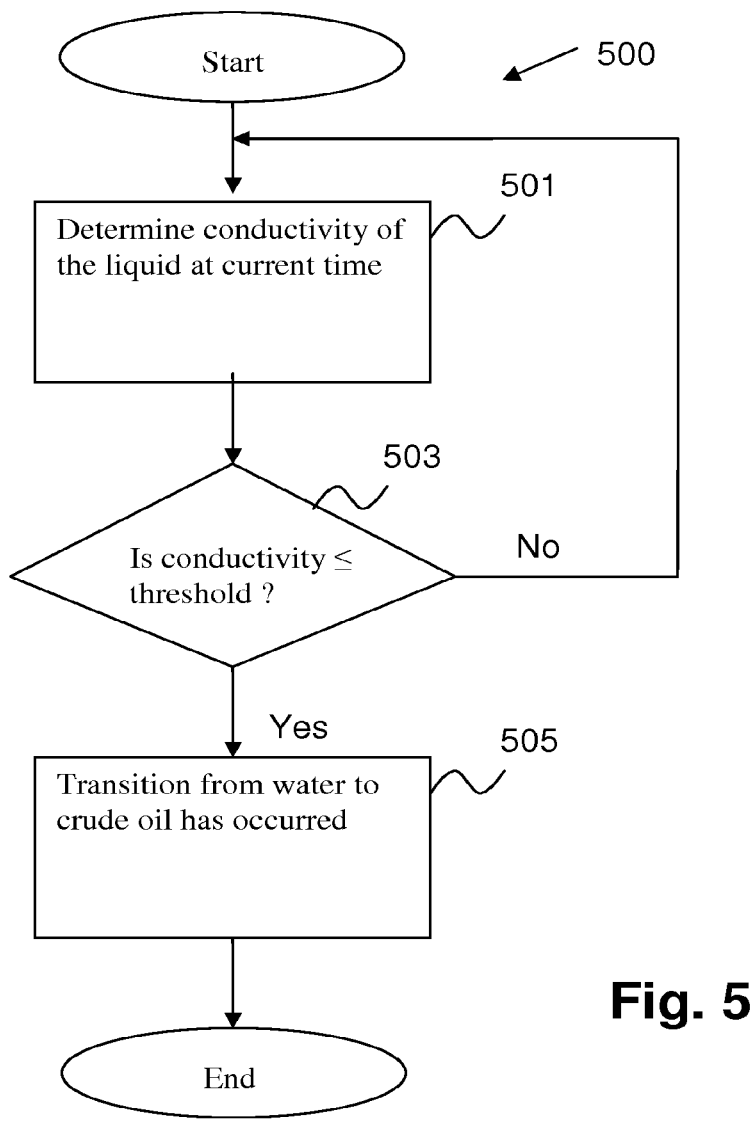
FIG. 5 is a flow diagram showing another method of detecting water to crude oil transition in a pipe of the system of FIG. 1.

The methods 300, 400 and 500 described above may alternatively be implemented in dedicated hardware such as one or more integrated circuits performing the functions or sub functions of FIGS. 3 to 5. Such dedicated hardware may include graphic processors, digital signal processors, or one or more microprocessors and associated memories.

In one embodiment, both of the methods 400 and 500 may be performed at step 303. In this instance, the transition from water to crude oil may be determined to have occurred only when both of the sensors 108 and 109 provide a result indicating that the transition has occurred (i.e., when the measured SPL is less than the first predetermined threshold value and the measured conductivity is less than the second predetermined threshold value).

Further, weightings may be applied to each of the sensors 108 and 109. For example, the acoustic sensor array 109 may be given a higher weighting than the conductivity sensor 108. In this instance, if the acoustic sensor array 109 indicates that the transition has occurred and the sensor 108 indicates that the transition has not occurred, then the processor 205 may still determine that the transition has occurred on the basis that the sensor array 109 has a higher weighting.

The processor 205 may be configured to adjust the weightings associated with each of the sensors 108 and 109, based on results produced by the system 100. For example, upon the sensors 108 and 109 being installed and trials being conducted on the system 100, one of the sensors 108 and 109 may be given a higher weighting if that sensor is found to produce more accurate and reliable results in indicating that the transition has occurred. After a predetermined period of time (e.g., one or more days or weeks) the weightings associated with the sensors 108 and 109 may be adjusted based on results at that time.

The acoustic sensor array 109 is preferably configured to permanently bolt to the pipe 104 at a predetermined point of the pipe 104. Alternatively, the acoustic sensor array 109 may be bolted to a fitting connected to the pipe 104. Any suitable acoustic sensor may be used for the acoustic sensor array 109 in the system 100. In one embodiment, the acoustic sensor 109 is a Sitrans™ AS100 manufactured by Siemens AG. The Sitrans™ AS100 requires a controller to process signals from the acoustic sensor array 109. In this instance, the controller is a Sitrans™ AS100+CU02 manufactured by Siemens AG. Such a controller is electrically configured between the acoustic sensor array 109 and the electronic device 151.

The conductivity sensor 108 is preferably configured to overcome fouling and be resistant to moderate temperatures, chemical exposure and physical wear. For example, the conductivity sensor 108 preferably has a large bore to allow solids to pass through the sensor 108 without plugging, to allow the sensor to be used for applications containing high levels of suspended solids. The conductivity sensor 108 is preferably configured to measure accurately over a large range of $Scm^{-1}$. The conductivity sensor 108 may be formed of an exceptionally strong and hard material (e.g., chemically resistant polyetheretherketone (PEEK)). Any suitable conductivity sensor may be used for the sensor 108 in the system 100. In one embodiment, the conductivity sensor 108 is a Rosemount™ Analytical Model 226 large bore "toroidal" conductivity sensor. The Rosemount™ Analytical Model 226 requires a controller to process signals from the conductivity sensor 108. In this instance, the controller is a Rosemount™ Analytical Model 54eC. Such a controller is electrically connected between the conductivity sensor 108 and the electronic device 151.

The Model 226 conductivity sensor is very resistant to fouling effects. The Model 226 uses an inductive method of measuring conductivity. In addition, the Model 226 has a large 47 mm bore to allow solids to pass through the sensor without plugging. The Model 226 is preferably configured to work at temperatures to 120° C. and measure accurately over the range of 50 $\mu Scm^{-1}$ to 1,000 $mScm^{-1}$.

In another embodiment, the conductivity sensor 108 is a Foxboro™ Model 875EC, Intelligent Electrochemical Analyser for Electrodes Conductivity Measurement sensor. In still another embodiment, the conductivity sensor 108 is a Foxboro™ Model 871EC-LB, Electrodes Conductivity Sensor-Large Bore, PEEK, High Sensitivity.

Figure 8:
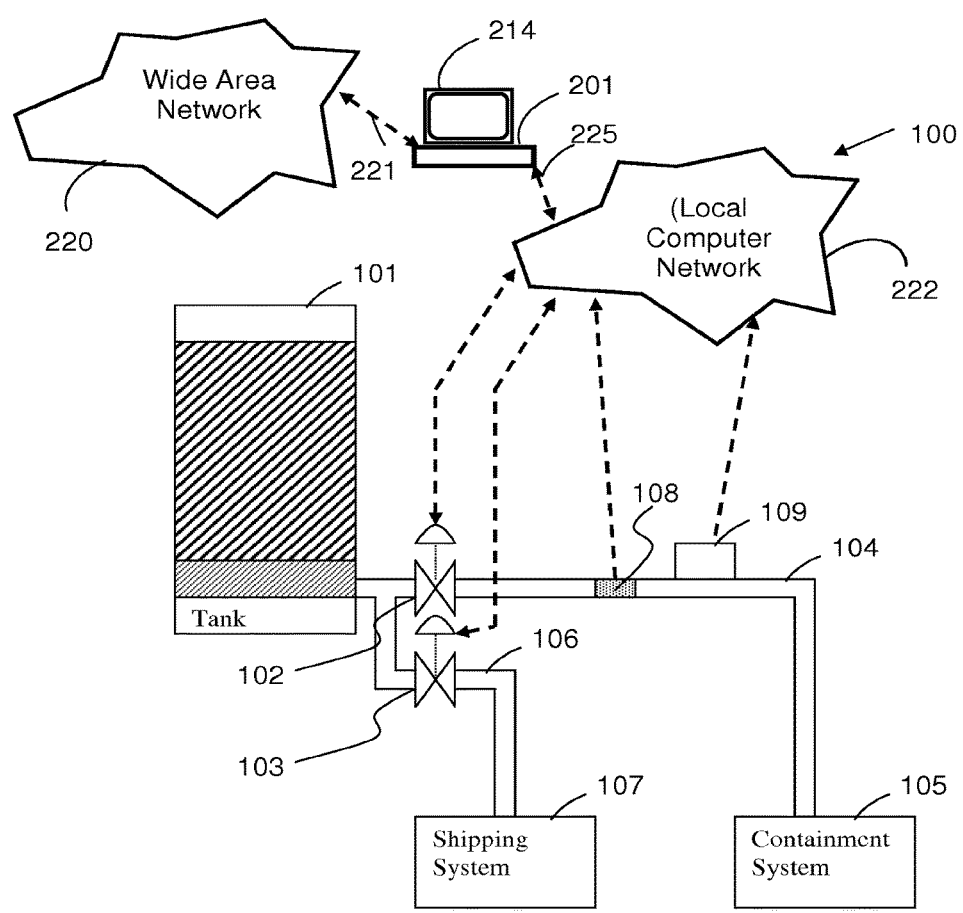
FIG. 8 shows an alternative system for dewatering the bulk-storage tank of FIG. 1.

In one embodiment, the valves 102 and 103, the acoustic sensor array 109 and the conductivity sensor 108 may be connected directly to the local computer network 222, as seen in FIG. 8. In the embodiment of FIG. 8, the methods described above may be implemented using the processor 205. In this instance, the processes of FIGS. 3 to 7 may be implemented as one or more software application programs resident within the hard disk drive 210 and being controlled in their execution by the processor 205. In particular, the steps of the described methods may be effected by instructions in the software that are carried out within the computer module 201.

The ratio of crude oil to water in the liquid at different times should preferably be displayed on the GUI. As described above, the ratio of crude oil to water may be determined by the processor 155 based on SPL and/or conductivity measurements. The system 100 may be calibrated so that predetermined SPL and/or conductivity measurements indicate certain water to crude oil ratios of the liquid.

The system 100 may also be configured so that the predetermined SPL and conductivity thresholds may be adjusted by an operator using the computer module 201.

The system 100 should preferably be fail-safe such that in the event of a failure the valves 102 and 105 should move to a closed position.

In one implementation, a measuring means, in the form of an accelerometer may be fixed to the pipe 104 in a similar manner to the acoustic sensor 109 and the conductivity sensor 108. The accelerometer may be used in place of the acoustic sensor array 109 and/or the conductivity sensor 108 or together with the array 109 and the sensor 108. Such an accelerometer may be adapted to the lower end of the frequency spectrum in order to measure vibration at a predetermined point of the pipe 104. In this connection, when water is flowing in the pipe 104, the measured vibration will be relatively higher than when crude oil is flowing in the pipe 104. A change in the level of vibration at the predetermined point of the pipe 104 may therefore be used to detect the water to crude oil transition of the liquid in a similar manner to the methods 400 and 500. Similar to the methods 400 and 500 described above, the measured vibration may be compared to a predetermined threshold level of vibration.

INDUSTRIAL APPLICABILITY

It is apparent from the above that the arrangements described are applicable to the computer and data processing industries.

The foregoing describes only some embodiments of the present invention, and modifications and/or changes can be made thereto without departing from the scope and spirit of the invention, the embodiments being illustrative and not restrictive.

For example, the methods 300, 400 and 500, and the system 100 have been described above with reference to crude oil. The described methods may have applications with other liquids and substances including petroleum products. Such petroleum products include unfinished oils, liquefied petroleum gases, pentanes plus, aviation gasoline, motor gasoline, naphtha-type jet fuel, kerosene-type jet fuel, kerosene, distillate fuel oil, residual fuel oil, petrochemical feedstocks, special naphthas, lubricants, waxes, petroleum coke, asphalt, road oil and still gas. However, for the acoustic sensor array 109 to accurately differentiate between water and other water-insoluble liquid, the kinetic viscosity of this other liquid needs to be greater than water.

In the context of this specification, the word "comprising" means "including principally but not necessarily solely" or "having" or "including", and not "consisting only of". Variations of the word "comprising", such as "comprise" and "comprises" have correspondingly varied meanings.

Appendix A

Kinematic Viscosity of Water and Oil

TABLE 1

| Liquid | Variant | Temperature | Kinematic Viscosity (cSt) |
|---|---|---|---|
| Crude oil | 48° API | 15.55 C. (60 F.) | 3.8 |
| Crude oil | 48° API | 54.44 C. (130 F.) | 1.6 |
| Crude oil | 40° API | 15.55 C. | 9.7 |
| Crude oil | 40° API | 54.44 C. | 3.5 |
| Crude oil | 35.6° API | 15.55 C. | 17.8 |
| Crude oil | 35.6° API | 54.44 C. | 4.9 |
| Crude oil | 32.6° API | 15.55 C. | 23.2 |
| Crude oil | 32.6° API | 54.44 C. | 7.1 |
| Water | Pure | 20.2 C. | 1.0000 |
| Water | Fresh | 15.55 C. | 1.13 |
| Water | Fresh | 54.44 C. | 0.55 |

Appendix B

Conductivity Information

TABLE 2

| Liquid | Variant | Conductivity (S) |
|---|---|---|
| Water | Pure | $5.5 \times 10^{-6}$ $Sm^{-1}$ |
| Water | Drinking | 0.005 to 0.05 $Sm^{-1}$ |
| Water | Sea | 5 $Sm^{-1}$ |
| Crude Oil | Maya | 60 to 110 $\times 10^{-6}$ $Sm^{-1}$ |

TABLE 2-continued

| Liquid | Variant | Conductivity (S) |
|---|---|---|
| Crude Oil | Istmo | 35 to 80 × $10^{-6}$ Sm$^{-1}$ |
| Diesel | United States of America | 50 to 840 × $10^{-12}$ Sm$^{-1}$ |
| Gasoline | United States of America | 25 × $10^{-12}$ Sm$^{-1}$ |

Appendix C

Density Information

TABLE 3

Densities of Water and Oil

| Liquid | Variant | Temperature | Density (kg/m^3) |
|---|---|---|---|
| Crude oil | 48° API | 15.55 C. (60 F.) | 790 |
| Crude oil | 40° API | 15.55 C. | 825 |
| Crude oil | 35.6° API | 15.55 C. | 847 |
| Crude oil | 32.6° API | 15.55 C. | 862 |
| Crude oil | California | 15.55 C. | 915 |
| Crude oil | Mexican | 15.55 C. | 973 |
| Crude oil | Texas | 15.55 C. | 873 |
| Water | Pure | 15.55 C. | 999 |
| Water | Sea | 25 C. | 1022 |

For extrapolation to other temperatures, refer to the following from the Revised Petroleum Measurement Tables (IP 200, ASTM D1250, API 2540 and ISO R91 Addendum 1)

$$\rho_t = \rho_{15}\exp[-a_{15}\Delta_t(1 + 0.8a_{15}\Delta_t)]$$ where:

$\rho_t$ = the product density at $t°$ C.

$\rho_{15}$ = the product density at 15° C.

$\Delta_t = t°$ C.$-15°$ C.

$a_{15}$ = tangent thermal expansion coefficient per ° C. at 15° C. =

$$\frac{K_0 + K_1\rho_{15}}{\rho_{15}^2}$$

TABLE 4

Density Extrapolation Variables
K0 and K1 are defined in accordance with Table 4 as follows:

| Product | Density Range (kg/m^3) | $K_0$ | $K_1$ |
|---|---|---|---|
| Crude Oil | 771-981 | 613.97226 | 0.00000 |
| Gasolines | 654-779 | 346.42278 | 0.43884 |
| Kerosenes | 779-839 | 594.54180 | 0.00000 |
| Fuel Oils | 839-1075 | 186.96960 | 0.48618 |

What is claimed:

1. An apparatus for controlling a water-crude oil separation process in a system including a bulk-storage tank for storing unrefined crude oil containing water, a first pipe for delivering water separated from crude oil in the bulk-storage tank and a water-oil mixture to a water containment system, a second pipe for delivering crude oil to an oil shipping system, a first valve for controlling flow of water in the first pipe and a second valve for controlling flow of oil in the second pipe, the apparatus comprising a control device for controlling operation of the first and second valves; a first sensor element arrangeable on a first pipe for sensing a first specific properties of water that flows through the first pipe; first means for comparing a measured value of the first specific property of water with a predetermined threshold value of the first specific property that characterizes the water-crude oil mixture that flows through the first pipe; a second sensor element arrangeable on a first pipe for sensing a second specific property of water that flows through the first pipe; second means for comparing a measured value of the second specific property of water with a predetermined threshold value of the second specific property that characterizes the water-crude oil mixture that flows through the first pipe, the control device including an embedded controller and an input/output (I/O) interface that connects the first and second comparing means with the controller, the controller comprising a processor for executing an application program for water-crude oil separation, the processor being configured to adjust weightings associated with each of two comparison values based on the results of operation of the system.

2. An apparatus according to claim 1, wherein the controller has an internal storage for storing the application program.

3. An apparatus according to claim 1, wherein the application program is communicated to the controller via internet or a private wide-area network from a remote computer.

4. An apparatus according to claim 1, wherein the at least two sensor elements are formed, respectively, as acoustic sensor array for measuring a sound pressure level of a water flow through the first pipe and a conductivity sensor for measuring conductivity of the water flow.

* * * * *

UNITED STATES PATENT AND TRADEMARK OFFICE
CERTIFICATE OF CORRECTION

| | | |
|---|---|---|
| PATENT NO. | : 10,344,221 B2 | Page 1 of 1 |
| APPLICATION NO. | : 15/957094 | |
| DATED | : July 9, 2019 | |
| INVENTOR(S) | : Al-Mulhim et al. | |

It is certified that error appears in the above-identified patent and that said Letters Patent is hereby corrected as shown below:

On the Title Page

Item {73} Assignee should be corrected to read:
Saudi Arabian Oil Company

Signed and Sealed this
Fifth Day of May, 2020

Andrei Iancu
*Director of the United States Patent and Trademark Office*